US007027396B1

(12) United States Patent
Golan et al.

(10) Patent No.: US 7,027,396 B1
(45) Date of Patent: Apr. 11, 2006

(54) TRAFFIC MATRIX COMPUTATION FOR A BACKBONE NETWORK SUPPORTING VIRTUAL PRIVATE NETWORKS

(75) Inventors: Joseph Golan, Ocean, NJ (US); Joseph Thomas O'Neil, Staten Island, NY (US)

(73) Assignee: AT&T Corp., New York, NY (US)

( * ) Notice: Subject to any disclaimer, the term of this patent is extended or adjusted under 35 U.S.C. 154(b) by 939 days.

(21) Appl. No.: 10/076,704

(22) Filed: Feb. 13, 2002

(51) Int. Cl.
*H04L 12/26* (2006.01)

(52) U.S. Cl. ........ 370/232

(58) Field of Classification Search ........ 370/229, 370/232; 709/217, 224
See application file for complete search history.

(56) References Cited

U.S. PATENT DOCUMENTS 5,450,408 A * 9/1995 Phaal ........ 370/256
5,539,659 A * 7/1996 McKee et al. ........ 709/224
5,966,509 A * 10/1999 Abe et al. ........ 714/4
6,115,393 A * 9/2000 Engel et al. ........ 370/469
6,339,595 B1 * 1/2002 Rekhter et al. ........ 370/392
6,754,699 B1 * 6/2004 Swildens et al. ........ 709/217
2002/0118678 A1 * 8/2002 Hamada ........ 370/389
2002/0141343 A1 * 10/2002 Bays ........ 370/235

* cited by examiner

*Primary Examiner*—Wellington Chin
*Assistant Examiner*—F. Lin Khoo

(57) ABSTRACT

This invention provides a more effective method for capacity planning and traffic engineering of packet networks that connect Virtual Private Network (VPN) sites. A distributed architecture efficiently computes traffic matrixes that show the number of bytes and/or packets exchanged among provider edge (PE) routers and/or service nodes. Each PE router in a service node is exports flow records to a Flow Record Processor (FRP) in the same location. The FRPs use these records in conjunction with configuration data extracted from the PE routers to compute partial traffic matrixes. The partial traffic matrixes are uploaded to a Matrix Generator to create a total traffic matrix. The total traffic matrix is essential input for capacity planning or traffic engineering tools.

33 Claims, 16 Drawing Sheets

| INPUT INTERFACE ADDRESS (302) | ROUTE DISTINGUISHER (304) |
|---|---|
| 10.1.1.1 | 89:17 |

| VPN-IPV4 ADDRESS (402) | BGP NEXT HOP ADDRESS (404) |
|---|---|
| 89:17:10.5.5.5 | 20.0.0.1 |

800

| INPUT INTERFACE ADDRESS (802) | INPUT LABEL (804) | OUTPUT INTERFACE ADDRESS (806) | OUTPUT LABEL (808) |
|---|---|---|---|
| 20.0.0.10 | 14 | 20.0.0.20 | 39 |

1206

| | |
|---|---|
| 1302 | INGRESS PE ROUTER LOOPBACK ADDRESS |
| 1304 | INGRESS PE ROUTER INPUT INTERFACE ADDRESS |
| 1306 | SOURCE ADDRESS |
| 1308 | DESTINATION ADDRESS |
| 1310 | TYPE-OF-SERVICE |
| 1312 | BYTE COUNT |
| 1314 | PACKET COUNT |
| 1316 | EGRESS PE ROUTER NAME |

1500

EGRESS PE ROUTER INDEX 0  1  2  ...  R-1

INGRESS PE ROUTER INDEX: 0, 1, 2, ..., R-1

1600

EGRESS SERVICE NODE INDEX 0  1  2  ...  N-1

INGRESS SERVICE NODE INDEX: 0, 1, 2, ..., N-1

TRAFFIC MATRIX COMPUTATION FOR A BACKBONE NETWORK SUPPORTING VIRTUAL PRIVATE NETWORKS

TECHNICAL FIELD

The present invention relates to capacity planning for backbone networks that support virtual private networks. Specifically, it defines a system and method to compute traffic matrixes for these networks. The matrixes report the number of bytes and packets that are exchanged among provider edge routers and/or service nodes. This data is essential input for capacity planning and traffic engineering tools.

BACKGROUND OF THE INVENTION

A Virtual Private Network (VPN) provides secure connectivity among distributed customer sites. VPNs can be implemented by using Border Gateway (BGP) and MPLS (Multiprotocol Label Switching) technologies. The official document on this topic is RFC 2547, BGP/MPLS VPNs, by Rosen and Rekhter at http://www.ietf.org and is incorporated by reference. MPLS and VPN Architectures, by Pepelnjak and Guichard, Cisco Press 2001 is also a valuable source of information and is also incorporated by reference. It provides a practical guide to understanding, designing, and deploying MPLS and MPLS-enabled VPNs.

A backbone network connects a plurality of customer sites that comprise a plurality of VPNs. Each site has one or more customer edge (CE) routers that connect to one or more provider edge (PE) routers in the backbone network. The PE routers in the backbone may be directly connected. Alternatively, the PE routers may be connected via provider (P) routers. The PE and P routers are located in service nodes that are geographically distributed.

Capacity planning and traffic engineering for backbone networks is required to provide adequate quality-of-service. A variety of software tools in the current art can be used for this purpose. One vendor that provides such tools is the Wide Area Network Design Laboratory. A description of their products is available at http://www.wandl.com. A second vendor is Optimum Network Performance. See http://www.opnet.com for more information about their products. Other vendors also offer products in this area.

These products require input that describes the traffic demands on a backbone network. This data can be provided as a matrix that shows the number of bytes and packets transmitted between PE routers. It is necessary to report this data separately for each type-of-service. A traffic matrix is a three dimensional matrix T[x][y][z] where x is the index of an ingress PE router, y is the index of an egress PE router, and z is the type-of-service (TOS). The values of x and y range from 0 to the number of PE routers−1. The value of z ranges from 0 to the number of types of service−1.

Alternatively, a capacity planning or traffic engineering tool may require a traffic matrix that characterizes the number of bytes and packets transmitted between service nodes. A traffic matrix is a three dimensional matrix T[x][y][z] where x is the index of an ingress service node, y is the index of an egress service node, and z is the type-of-service (TOS). The values of x and y range from 0 to the number of service nodes−1. The value of z ranges from 0 to the number of types of service−1.

A variety of protocols are used to route packets in the backbone network. These protocols are defined in specifications at http://www.ietf.org. For example, the Open Shortest Path First (OSPF) protocol is used to route within an autonomous system as described in RFC 2328, OSPF Version 2, by J. Moy. The Border Gateway Protocol is used to route among autonomous systems as described in RFC 1771, A Border Gateway Protocol, by Y. Rekhter and T. Li. The Border Gateway Protocol is also described in RFC 1772, Application of the Border Gateway Protocol in the Internet, by Y. Rekhter and P. Gross. The Multi-Protocol Label Switching (MPLS) technology is described in RFC 3031 Multiprotocol Label Switching Architecture by Rosen, et. al. Many books describe these protocols as well. For example, Computer Networks, Third Edition, by A. Tanenbaum, Prentice-Hall, 1996 is an excellent reference text. Routing in the Internet, by Christian Huitema, Prentice Hall, 1995 is also valuable. BGP4 Inter-Domain Routing in the Internet, by John Stewart III, Addison-Wesley, 1999 describes BGP-4. See MPLS: Technology and Applications, by Davie and Rekhter, Morgan Kafmann, 2000 for a discussion of that protocol.

PE routers in the current art can be configured to generate records that provide summary information about packet flows. A flow is a sequence of packets from a source to a destination. A PE router identifies a flow by examining the packets that enter its interfaces. Packets having identical values for source address/port, destination address/port, protocol, type-of-service, and input interface address are considered to be part of the same flow.

Flow records contain multiple items (e.g. source address/port, destination address/port, protocol, type-of-service, input interface address). In addition, a PE router counts the number of bytes and packets that comprise this flow and includes these values in the flow record. Flow records provide raw data about packet flows through a network. A PE router is configured to transmit flow records to a specific address and port. This occurs when the flow completes. It may also occur multiple times during a flow.

Cisco is a network equipment vendor that provides flow record generation. This feature on their products is called NetFlow. Each Version 5 NetFlow record contains source IP address, destination IP address, source TCP or UDP port, destination TCP or UDP port, next hop router IP address, incoming interface address or index, outgoing interface address or index, packet count, byte count, start of flow timestamp, end of flow timestamp, IP protocol, type-of-service, TCP flags, source autonomous system, destination autonomous system, source subnet, and destination subnet. Other formats are also available. See http://www.cisco.com for a detailed description of this feature.

It is a difficult task to generate traffic matrixes. Traffic volumes through a backbone network are substantial. Flow records may total several megabytes. Centralized architectures that upload these records to one machine for processing are not satisfactory. The time to upload and process the records is substantial.

Therefore, a need exists for a distributed architecture in which records may be processed in each service node. This will significantly reduce the time to generate a matrix. It will also allow matrixes to be generated more frequently. More frequent generation of matrixes provides a more accurate view of the backbone network traffic.

SUMMARY OF THE INVENTION

Limitations of the prior art are overcome and a technical advance is achieved by the present invention. The present invention provides a system and method to generate traffic matrixes for backbone networks that support virtual private networks (VPNs). These backbone networks provide high-speed connectivity among a plurality of customer sites for a plurality of VPNs.

Provider edge (PE) routers are configured to generate records for incoming flows on external interfaces. These are the interfaces connected to customer edge (CE) routers.

Flow records are transmitted to a Flow Record Processor (FRP) in the same service node as the PE routers. The FRPs use these flow records in conjunction with configuration data extracted from the PE routers to compute partial traffic matrixes. Each partial traffic matrix indicates how packet flows are distributed from each of the PE routers that are located in a service node.

The partial traffic matrixes are uploaded to a Matrix Generator (MG) to create total traffic matrixes. A total traffic matrix is calculated by adding the partial traffic matrixes that are received from the FRPs.

A second embodiment of this invention generates traffic matrixes by using sampled flow records. Non-sampled flow records require a PE router to examine every packet that passes through the device. This can impose a significant processing overhead on the device. To minimize this overhead, a sampling technique can be used. Every M-th packet is analyzed and flows are identified from sampled packets.

A third embodiment of this invention automatically determines the measurement interval for which a traffic matrix should be generated.

BRIEF DESCRIPTION OF THE DRAWINGS

The above-summarized invention will be more fully understood upon consideration of the following detailed description and the attached drawings wherein:

FIG. 3 shows the format of the Route Distinguisher Table.

FIG. 4 shows the format of the Border Gateway Protocol Table.

DETAILED DESCRIPTION

FIGS. 1–8 outline the current art. FIGS. 9–16 illustrate the present invention. Those skilled in the art will discern alternative system and method embodiments within the spirit of the present invention, and within the scope of the attached claims, from consideration of the present inventive teachings.

Figure 1:
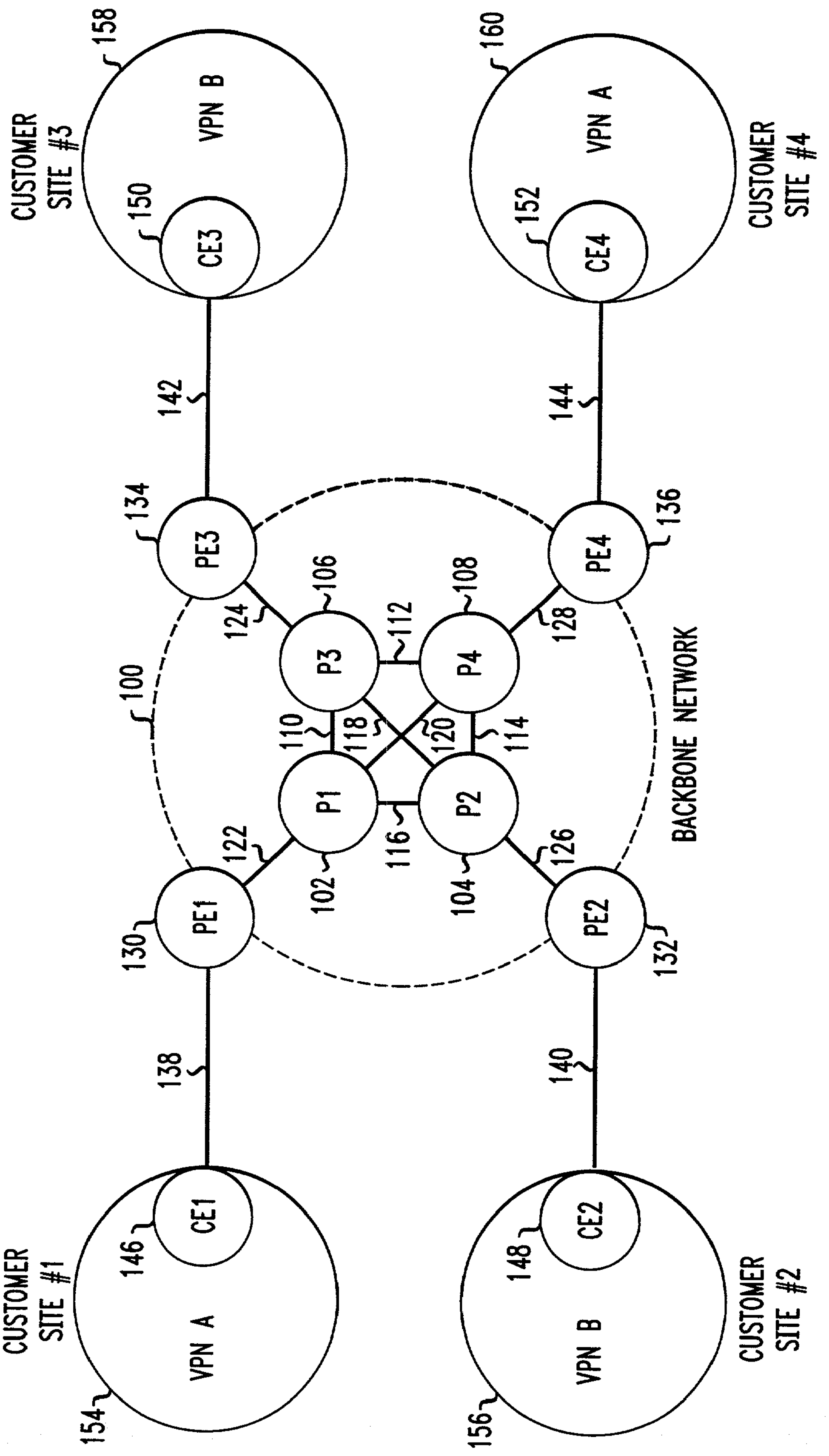
FIG. 1 shows an illustrative backbone network that connects several VPN sites.

FIG. 1 shows an illustrative backbone network 100 in the current art. This network provides connectivity among several customer sites that comprise two virtual private networks. VPN A consists of two customer sites 154 and 160. VPN B consists of two customer sites 156 and 158.

The backbone network 100 contains provider (P) routers 102, 104, 106, and 108. It also contains provider edge (PE) routers 130, 132, 134, and 136. The function of the P routers is to provide connectivity among the PE routers. The function of the PE routers is to provide access to the backbone network for customer sites.

Each of the routers is interconnected by links. For example, PE router 130 connects to P router 102 via link 122. P router 102 connects to P router 108 via link 120.

Customer edge (CE) routers 146, 148, 150, and 152 are situated at the customer sites 154, 156, 158, and 160, respectively. Each CE router connects to a PE router. For example, CE router 146 connects to PE router 130 via link 138.

More complex topologies are also permitted. A CE router may connect to multiple PE routers. A PE router may connect to multiple CE routers. PE routers may directly connect to each other.

Packet traffic is transported between customer sites for a specific VPN via Multiprotocol Label Switching (MPLS) tunnels. Each MPLS tunnel begins at one PE router and ends at a different PE router. For example, packet traffic is transported from customer site 154 to customer site 160 via an MPLS tunnel that starts on PE router 130 and ends on PE router 136.

Packet traffic is typically transported only between customer sites that are in the same VPN. For example, packets from VPN A are not transported to VPN B. However, more complex topologies are also permitted. Several VPNs may be combined to form an extranet. An extranet permits communication among sites in different VPNs.

Figure 2A:
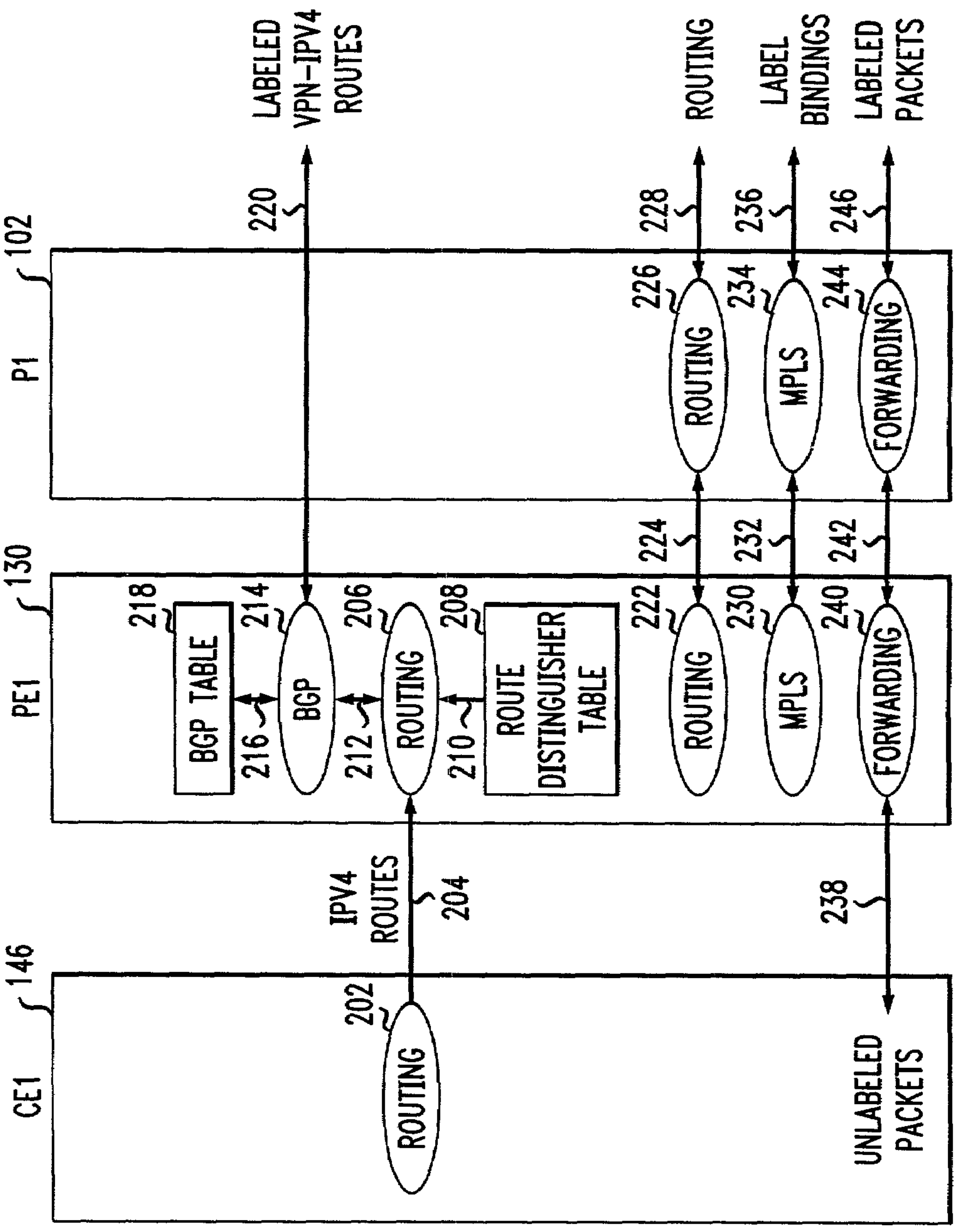
FIGS. 2A and 2B illustrate the routing and forwarding processes for part of the backbone network.
Figure 2B:
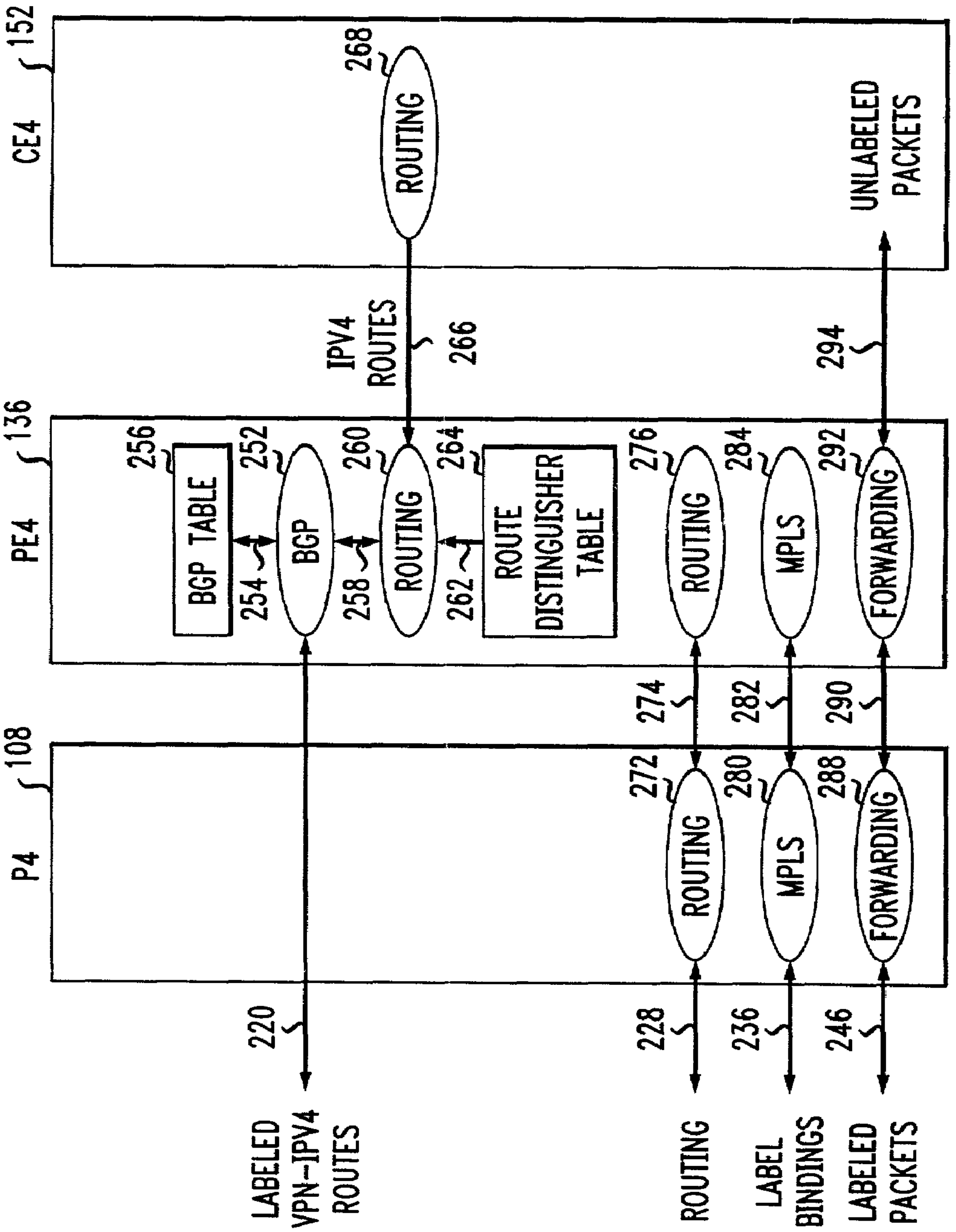

FIGS. 2A–2B illustrate the routing and forwarding processes for a subset of the backbone network 100. CE router 146 executes a routing process 202 that communicates IPV4 routes to a peer routing process 206 on PE router 130.

Customer VPNs may use overlapping addresses. RFC 1918, Address Allocation for Private Internets, by Rekhter, et. al. at http://www.ictf.org defines portions of the IPV4 address space that are reserved for private use.

Therefore, routing process 206 must translate each IPV4 route that is received from CE router 146. Data from the Route Distinguisher Table 208 is used to convert an IPV4 route to a VPN-IPV4 route. (The Route Distinguisher Table 208 is described later in this document.) The VPN-IPV4 routes are given to the BGP process 214.

The BGP process 214 assigns an MPLS label to each VPN-IPV4 route. This data is stored in the BGP table 218. The labeled VPN-IPV4 routes 220 are exchanged with a peer BGP process 252 on PE router 136 (FIG. 2B). The BGP processes on the PE routers exchange labeled VPN-IPV4 routes. In this manner, the routes generated by each customer site of a VPN are exchanged with all other sites in that same VPN.

P routers do not store any VPN routes. VPN routes are stored only on PE routers. This is important because it provides an architecture that scales to large numbers of VPNs.

The routers in the backbone network execute routing processes to exchange Internet Protocol Version 4 (IPV4) routes. These routes are required to transport packets across the backbone network. For example, PE router 130 executes a routing process 222 that peers with routing process 226 on P router 102.

The routers in the backbone network execute MPLS processes to exchanges label bindings across the backbone network. MPLS tunnels start and end at PE routers. For example, packets from CE router 146 can be transported to CE router 152 via an MPLS tunnel across the backbone.

The routers in the backbone network execute forwarding processes to transport labeled packets from a source PE router to a destination PE router. For example, PE router 130 executes a forwarding process 240 that receives unlabeled packets on link 238 from CE router 146. It converts these unlabeled packets to labeled packets that are transmitted to the forwarding process 244 on P router 102. The forwarding process 240 also receives labeled packets on link 242 from P router 102. It converts these labeled packets to unlabeled packets that are transmitted to CE router 146.

The P routers in the backbone have no knowledge of VPN routes. Their only function is to provide connectivity for PE routers. For example, P router 102 executes routing process 226 to exchange IPV4 routes with its neighboring routers. An MPLS process 234 exchanges label bindings with its neighboring routers. A forwarding process 244 uses these label bindings to transport packets through the backbone.

FIG. 3 shows the format of a Route Distinguisher (RD) Table 208. Each record in the table contains an input interface address 302 and a route distinguisher 304. A route distinguisher is a 64-bit number assigned by a network provider to uniquely identify a VPN. It is used to convert IPV4 addresses to VPN-IPV4 addresses. The format of a route distinguisher is <number1>:<number2>where number1 is a four byte quantity and number2 is a four byte quantity. The sample record shown in FIG. 3 has an input interface address equal to 10.1.1.1 and a route distinguisher equal to 89:17.

A PE router uses the RD Table to translate IPV4 routes that are received from CE routers to which it is directly connected. Assume that PE router 130 receives an IPV4 routing update from CE router 146 via link 138 (see FIG. 1). The RD Table is searched to find a record with an incoming interface address 302 that matches the address of link 138. The route distinguisher 304 is read from that record. Each IPV4 address in the routing update is translated to a VPN-IP4 address by using the route distinguisher as a prefix.

The RD Table on each PE router is configured so the non-unique IPV4 addresses from each VPN are converted to unique VPN-IPV4 addresses. The unique VPN-IPV4 addresses are exchanged among the PE routers by the BGP processes that execute on those routers.

FIG. 4 shows the format of a BGP Table 218. Each record in the table contains a VPN-IPV4 address 402 and a BGP next hop address 404. Entries are created in the BGP Table when: (a) routes are received from customer sites and (b) routes are received from BGP peers.

Assume that CE router 146 transmits an IPV4 route to PE router 130 (see FIG. 1). The destination address is translated to a VPN-IPV4 address by using the RD Table 208. The translated route is then stored in BGP Table 218. The BGP next hop is the loopback address of the PE router 130. The BGP process 214 exchanges this information with the BGP process that executes on each PE router. For example, BGP process 214 exchanges labeled VPN-IPV4 routes with BGP process 252.

Assume that CE router 152 transmits an IPV4 route to PE router 136. The destination address is translated to a VPN-IPV4 address by using the RD Table 264. The translated route is then stored in BGP Table 256. The BGP next hop is the loopback address of the PE router 136. The BGP process 252 exchanges this information with the BGP process that executes on each PE router. For example, BGP process 252 exchanges labeled VPN-IPV4 routes with BGP process 214.

The BGP next hop address is always the loopback address of the PE router that created the VPN-IPV4 route. This fact is critical for the operation of the present invention. It enables the egress PE router for a flow to be efficiently determined from information on the ingress PE router.

The sample record shown in FIG. 4 has a VPN-IPV4 address of 89:17:10.5.5.5 and a BGP next hop address of 20.0.0.1. The VPN-IPV4 address contains a route distinguisher of 89:17 and an IPV4 address of 10.5.5.5. The BGP next hop address is the IPV4 loopback address of the egress PE router.

Figure 5:
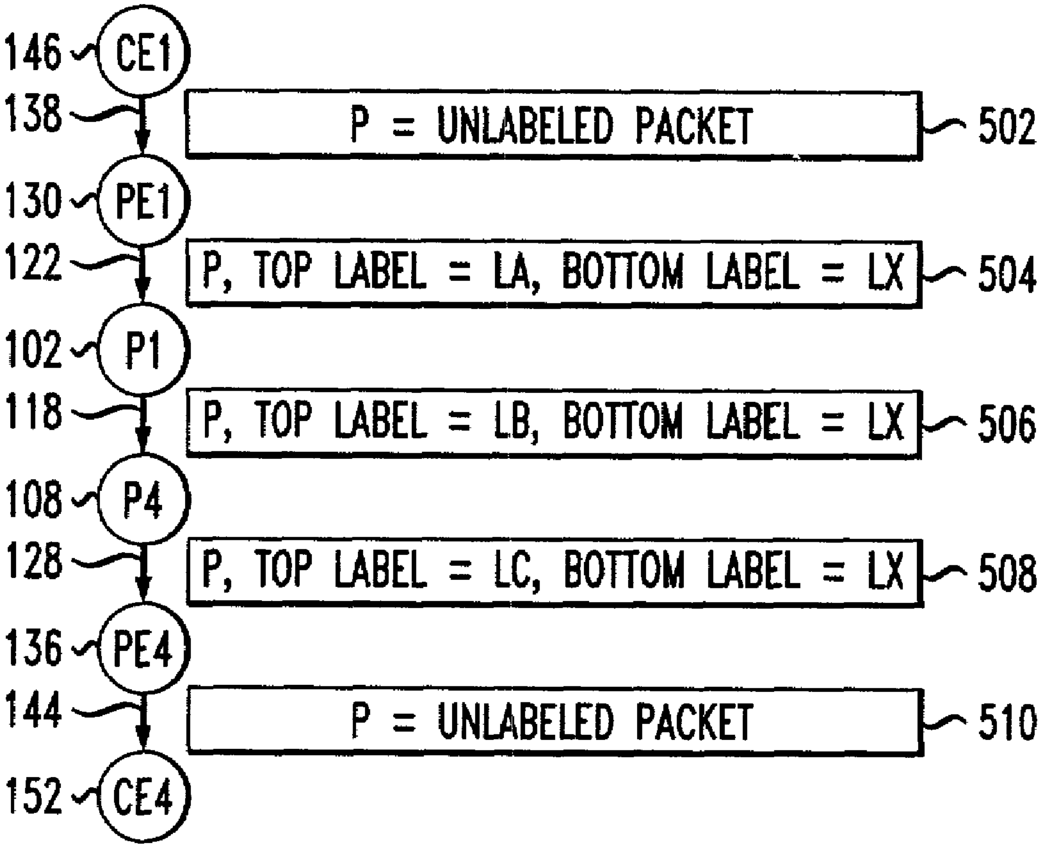
FIG. 5 shows how MPLS transports packets across the backbone network.

FIG. 5 shows how MPLS is used to transport packets across the backbone network 100. A CE router transmits an unlabeled packet to a PE router. The PE router assigns labels to these packets. The labels are numbers that are used by the P routers to forward the packets across the backbone network. The egress PE router removes the labels from the packet. The packet is then forwarded to the destination CE router.

Various protocols in the current art are used to distribute label assignments among P and PE routers. The Label Distribution Protocol (LDP) is an example of such a protocol. More information about this and other alternatives can be found at http://www.ietf.org.

In some circumstances, several labels may be assigned to a packet. These labels are organized in a stack. A label is pushed to the top of the stack or pulled from the top of the stack. Further discussion of label stacks can also be found at http://wwe.ietf.org.

In FIG. 5, CE router 146 transmits an unlabeled packet 502 to PE router 130. PE router 130 uses the information from BGP process 214 and MPLS process 230 (FIG. 2A) to assign labels to this packet. A two level label stack is used. The bottom label indicates the target PE router 136. This is shown on the diagram as LX. The top label indicates the next hop P router 102. This is shown on the diagram as LA. The packet 504 is then transmitted to P router 102.

router 102 receives this packet 504. It swaps the top label on the stack. The value LA is replaced by the value LB. The packet 506 is then transmitted to P router 108.

P router 108 receives this packet 506. It swaps the top label on the stack. The value LB is replaced by the value LC. The packet 508 is then transmitted to PE router 136.

PE router 136 receives this packet 508. It pops the top label on the stack. It pops the bottom label on this stack. The bottom label indicates the destination CE router 152 for the packet. The unlabeled packet 510 is then transmitted to CE router 152.

This two level label stack makes it unnecessary to store VPN-IPV4 routes on P routers. This design is essential to achieve a scalable system.

Figure 6:
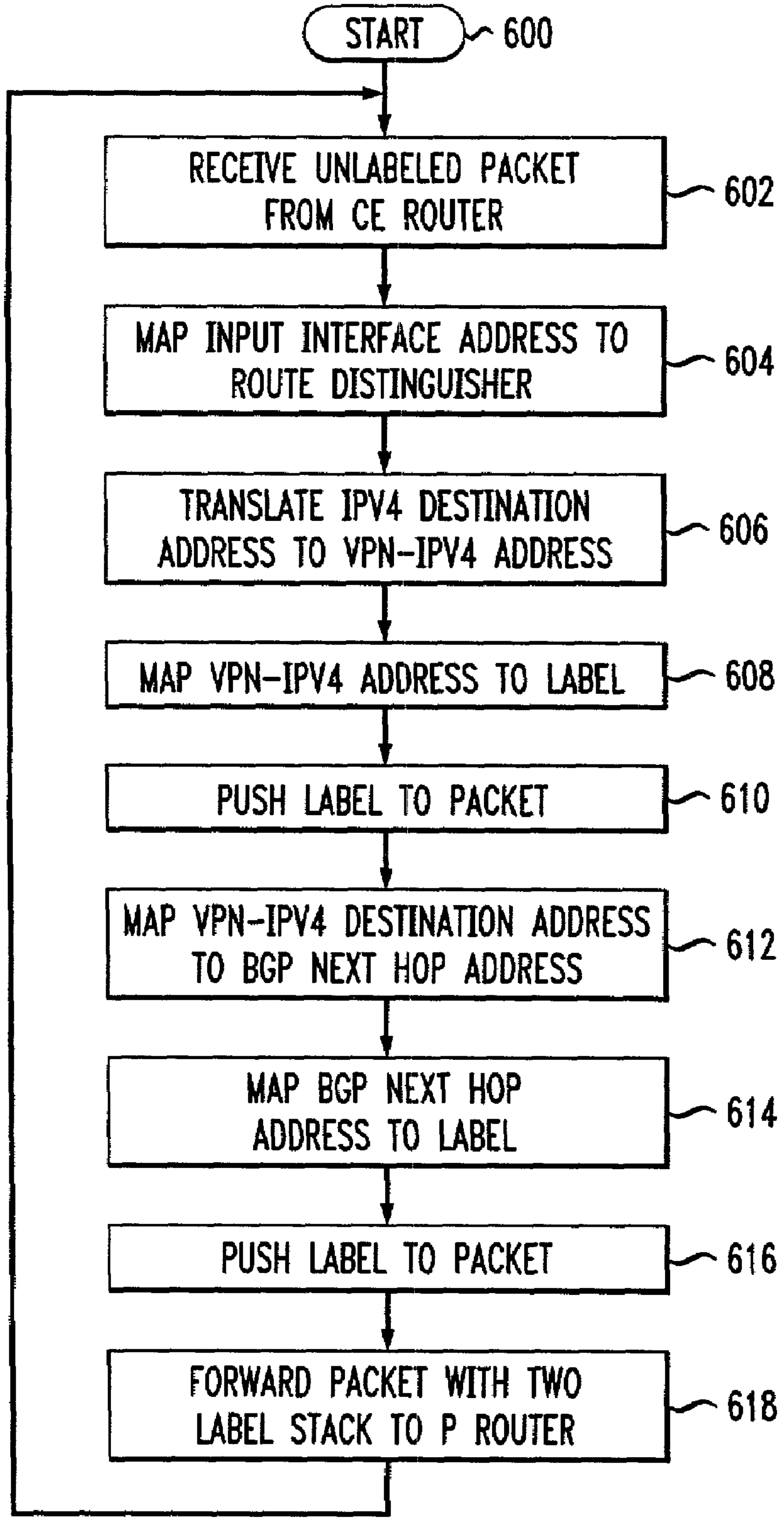
FIG. 6 is a flowchart for packet labeling by a PE router.

FIG. 6 is a flowchart for packet labeling by a PE router. Execution starts at step 600. At step 602, an unlabeled packet is received from a CE router. At step 604, the input interface address is mapped to a route distinguisher. The mapping is accomplished by searching the Router Distinguisher Table 208 for a record with a matching input interface address. At step 606, the IPV4 destination address is translated to a VPN-IPV4 address. The route distinguisher is prefixed to the IPV4 destination address of the packet to create the VPN-IPV4 address. At step 608, the VPN-IPV4 address is mapped to a label. The label is determined from the VPN-IPV4 routes that are exchanged among the BGP processes on the PE routers. At step 610, this label is pushed to the label stack in the packet. At step 612, the VPN-IPV4 destination address is mapped to a BGP next hop address. This is done via the BGP table. At step 614, the BGP next hop address is mapped to a label. This label is determined from the bindings that are exchanged with an MPLS process on a neighboring backbone router. At step 616, this label is pushed to the label stack in the packet. The packet now contains a two level label stack. At step 618, the labeled packet is forwarded to a P router. Execution continues at step 602 when the next unlabeled packet is received.

Figures 7, 8:
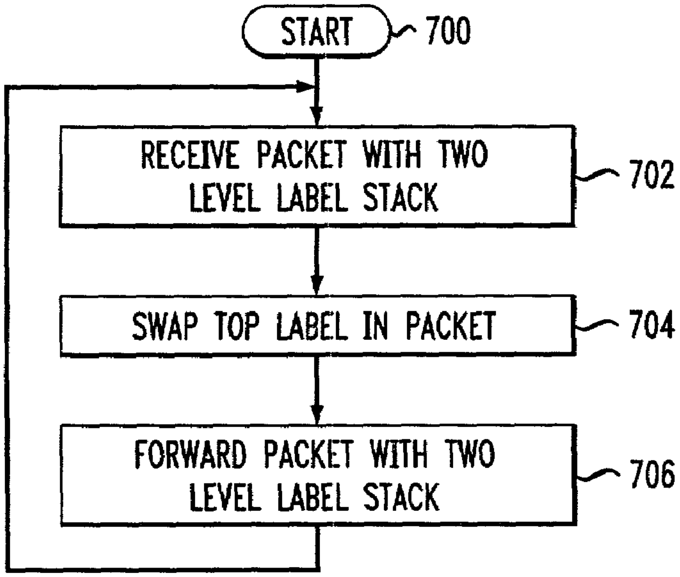
FIG. 7 is a flowchart for packet forwarding by a P router.
FIG. 8 shows the format of a Label Forwarding Table on a P router.

FIG. 7 is a flowchart for packet forwarding by a P router. Execution starts at step 700. At step 702, a packet with a two level label stack is received. The top label is swapped at step 704. At step 706, the packet is forwarded to the next hop.

FIG. 8 shows the format of a Label Forwarding (LF) Table 800 on a P router. Each record in the table contains an input interface address 802, an input label 804, an output interface address 806, and an output label 808. The sample record shown in FIG. 8 has an input interface address equal to 20.0.0.10, an input label equal to 14, an output interface address equal to 20.0.0.20, and an output label equal to 39. This record specifies that when a packet with a top label equal to 14 arrives on interface 20.0.0.10, the label is replaced with a label equal to 39 and the packet is output on interface 20.0.0.20.

Referring to FIGS. 2A and 2B, each P router contains an LF Table that is used by the forwarding process on that router. Assume that P router 102 receives a labeled packet from PE router 130 on interface 242. The forwarding process 244 searches the LF Table for a record with a matching input interface address 802 and input label 804. The top label in the packet is used for this search. If a match is found, the input label is replaced with the output label 808. The modified packet is transmitted on the output interface address 806. If a match is not found, the packet is dropped.

Figure 9:
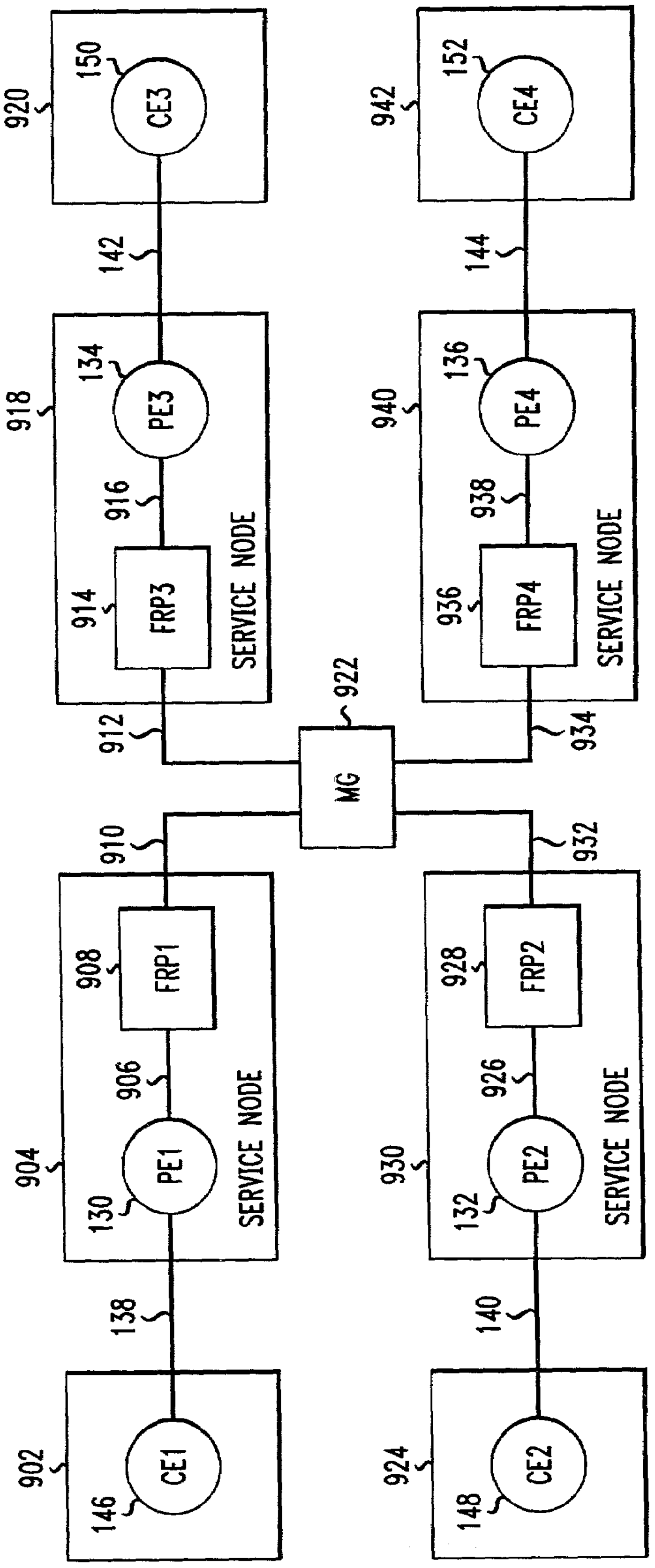
FIG. 9 shows Flow Record Processors and a Matrix Generator in the backbone network.

FIG. 9 shows Flow Record Processors (FRPs) and a Matrix Generator (MG) in the backbone network 100 in accordance with an embodiment of the present invention. The illustrative network shows four service nodes 904, 918, 930, and 940. Each of these service nodes contains one PE router and one FRP. For example, PE router 130 and FRP 908 are located in service node 904. The FRP collects and processes flow records generated by the PE router. It is to be understood by those skilled in the art that more complex topologies are also permitted. For example, a service node may contain several PE routers. These routers connect to an FRP in the same service node.

Each FRP connects to the MG 922. The MG transmits configuration files to the FRPs. It receives partial traffic matrixes from the FRPs. A partial traffic matrix shows how traffic entering the PE routers in one service node is distributed. The MG adds all of the partial matrixes together to generate a total traffic matrix.

FIG. 9 also shows how CE routers in customer sites connect to PE routers in service nodes. The illustrative network shows four customer sites 902, 924, 920, and 942. Each of these customer sites contains one CE router. For example, CE router 146 in customer site 902 connects to PE router 130 in service node 904. It is to be understood by those skilled in the art that more complex topologies are also permitted. For example, a customer site may contain several CE routers. Each of these routers may connect to PE routers in one or more service nodes.)

Figure 10:
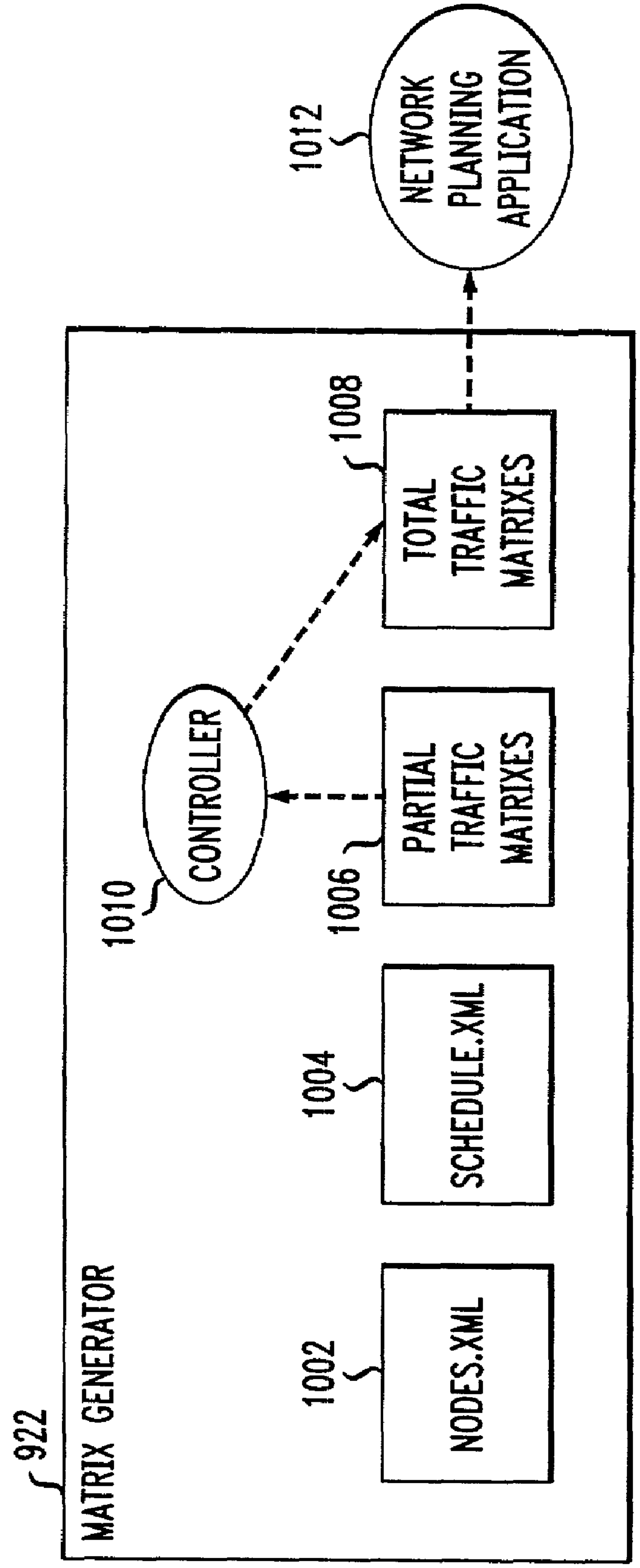
FIG. 10 is a block diagram of the Matrix Generator.

FIG. 10 shows a block diagram of the Matrix Generator 922. The primary functions of the MG are: (1) to download configuration files to the FRPs, (2) to upload partial traffic matrixes from the FRPs, and (3) to calculate total traffic matrixes by summing partial traffic matrixes. A file entitled nodes.xml 1002 is a configuration file that defines the names and loopback addresses of the PE routers in the service nodes. It also contains the names and addresses of the FRPs. A second file entitled schedule.xml 1004 is a configuration file that defines the start and duration of measurement intervals for which traffic matrixes are generated. Partial traffic matrixes are generated by the FRPs in the backbone network and stored in a partial traffic matrixes database 1006. These files are uploaded from the FRPs to the MG. Total traffic matrixes are generated from the partial traffic matrixes by the MG 922 and stored in a total traffic matrixes database 1008. These matrixes are provided as input to a Network Planning Application 1012.

This specification uses Extensible Markup Language (XML) to format configuration information. Detail pertaining to the use of XML are well known to those skilled in the art. It is to be understood by those skilled in the art that other techniques (e.g. binary data, SNMP data) could also be used without departing from the scope and spirit of the present invention.

An excerpt from a sample file for nodes.xml 1002 is shown in the following listing. The name of the service node is Tokyo. It contains one FRP at address 135.89.0.1. It also contains two PE routers. One is named PE1 with a loopback address of 135.89.0.2. The other is named PE2 with a loopback address of 135.89.0.3.

```
<service-nodes>
<service-node>
  <name/>Tokyo
  <flow-record-processor-address/>135.89.0.1
  <pe-router>
    <name/>PE1
    <loopback address/>135.89.0.2
  </pe-router>
  <pe-router>
    <name/>PE2
    <loopback address/>135.89.0.3
  </pe-router>
</service-node>
. . .
</service-nodes>
```

The index associated with each PE router is determined by its sequence in the nodes.xml file. The first PE router has an index equal to 0. The last PE router has an index equal to the number of PE routers—1.

A sample file for schedule.xml 1004 is shown in the following listing. It defines two measurement intervals for which traffic matrixes are generated. The first measurement interval starts every Monday at 12:00 Greenwich Mean Time. The duration of the interval is 15 minutes. The second measurement interval starts at 4 Jul. 2001 at 22:00 Greenwich Mean Time. The duration of the interval is 20 minutes.

A measurement interval should be long enough so representative data can be collected. However, it should be short enough so storage and processing requirements are not excessive.

```
<schedule>
  <measurement-interval/>
    Mon-12:00-GMT, 15 minutes
  <measurement-interval/>
  4, Jul. 2001-22:00-GMT, 20 minutes
</schedule>
```

The format of the partial traffic matrixes 1006 and total traffic matrixes 1008 are described later in this specification.

Figure 11:
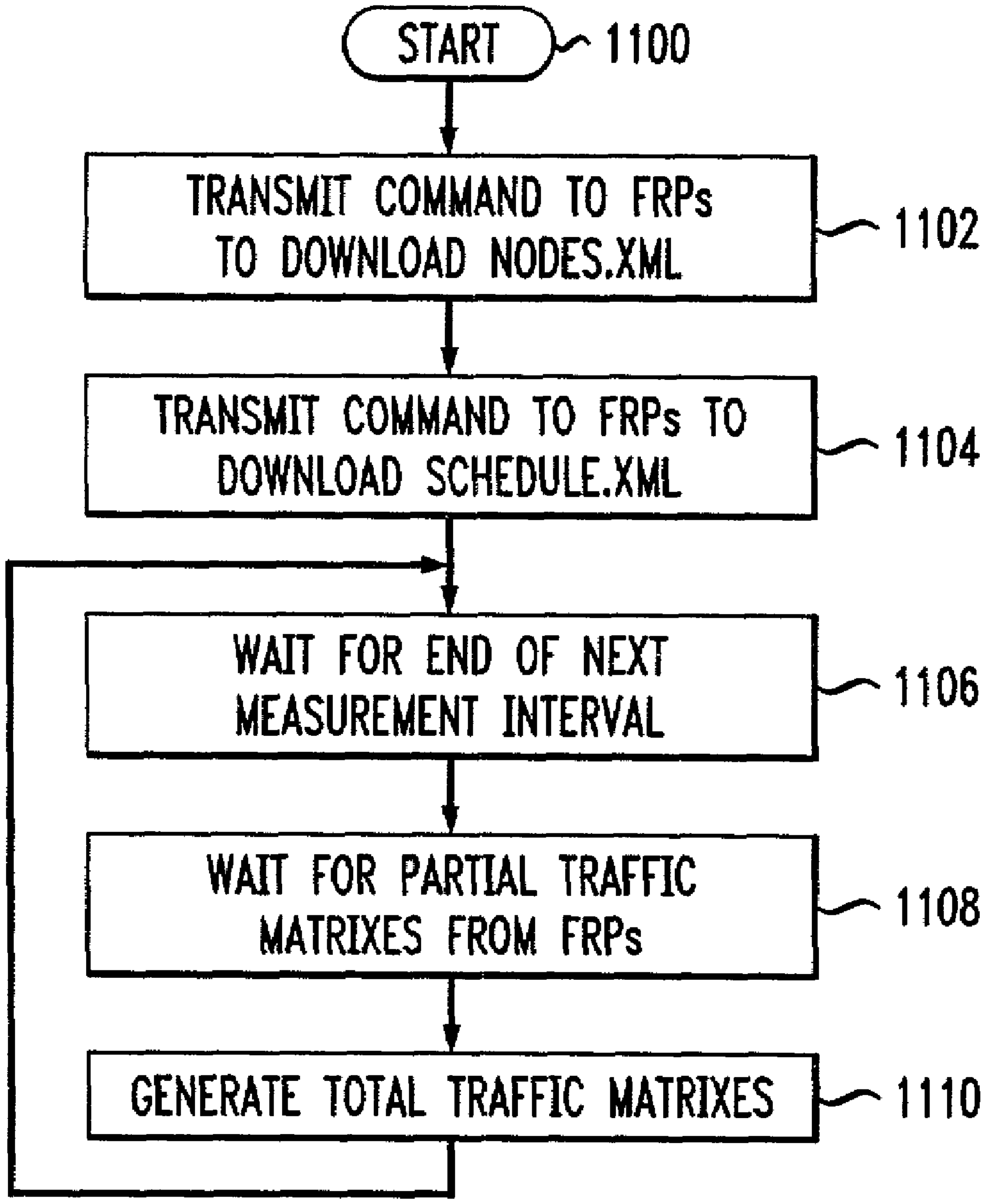
FIG. 11 is a flowchart for the Matrix Generator.

FIG. 11 is a flowchart for the Controller 1010 on Matrix Generator (MG) 922 in accordance with the present invention. Execution starts at 1100. At step 1102, the MG transmits a command to the FRPs to download nodes.xml 1002. The addresses of the FRPs are defined in nodes.xml. At step 1104, the MG transmits a command to the FRPs to download schedule.xml. At step 1106, execution blocks until the end of the next measurement interval. At step, 1108, the MG waits for the partial traffic matrixes to be uploaded from the FRPs. At step 1110, the total traffic matrix is computed by adding all of the partial traffic matrixes. Execution continues at step 1106.

Figure 12:
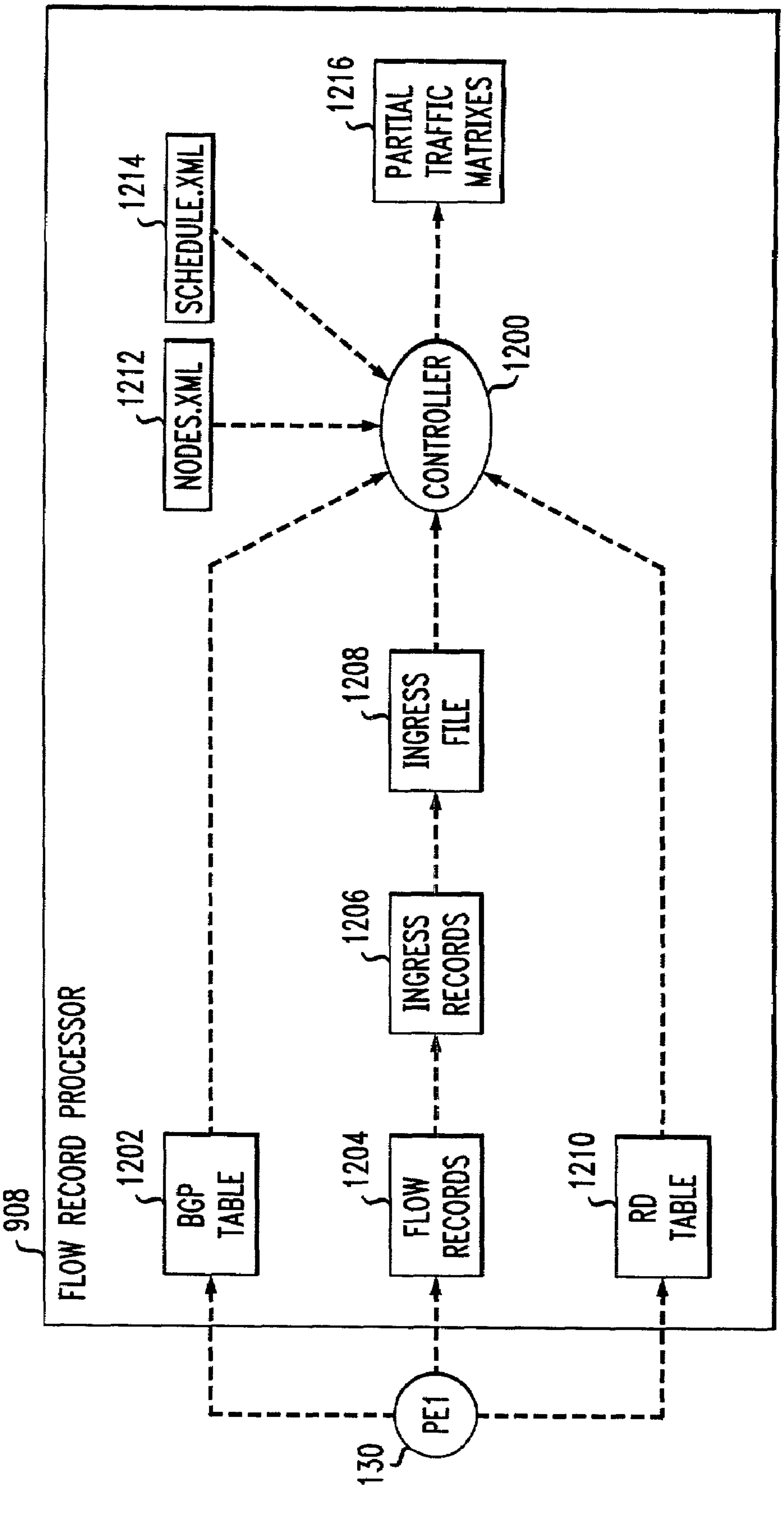
FIG. 12 is a block diagram of the Flow Record Processor.

FIG. 12 shows a block diagram of a Flow Record Processor (FRP) 908. The purpose of an FRP is to generate partial traffic matrixes that describe how traffic entering the PE routers at a service node is distributed (to other PE routers or to other service nodes). An FRP contains a Controller 1200. The Controller 1200 coordinates all activities of the FRP and is explained in more detail hereinafter (see FIGS. 14A–14D). An FRP contains two configuration files named nodes.xml 1212 and schedule.xml 1214. These files are downloaded from the MG 922 (see FIG. 9). An FRP also contains the BGP Table 1202 and RD Table 1210 from each of its PE routers. The Controller 1200 uploads these files from each of the PE routers in the service node.

Assume that PE router 130 receives an incoming packet flow. It stores important information about the flow (e.g. source address/port, destination address/port, type-of-service, input interface). It also counts the number of bytes and packets that comprise the flow. This data is transmitted from PE router 130 to FRP 908. The Controller 1200 receives these flow records 1204 and extracts relevant data as described in further detail hereinafter to create ingress records 1206. The ingress records 1206 are stored in an ingress file 1208.

It is important to note that PE router 130 may export several flow records for the same flow. This is because each PE router 130 contains a fixed size buffer in which it records the cumulative byte and packet counts for each active flow. If this buffer is not sufficient to contain the counts for all active flows, the data for the oldest flow is exported as a flow record. This is done to allocate buffer space for the newest flow.

After a measurement interval has completed, the Controller 1200 generates a partial traffic matrix 1216 for that interval. This calculation is done by using: (a) the nodes.xml file 1212 that was retrieved from the MG 922, (b) the schedule.xml file 1214 that was retrieved from the MG 922, (c) the BGP table 1202 that was retrieved from each PE router in the service node, (d) the RD Table 1210 that was retrieved from each PE router in the service node, and (e) the ingress file 1208 that was created from the flow records 1204 that were exported by each PE router in the service node.

FIG. 12 shows how the FRP 908 receives configuration files and flow records from one PE router 130. If a service node contains multiple PE routers, the Controller 1200 extracts a BGP Table 1202 and RD Table 1210 from each of these routers. In addition, a separate ingress file 1208 is created for each measurement interval for each PE router in the service node.

Figure 13:
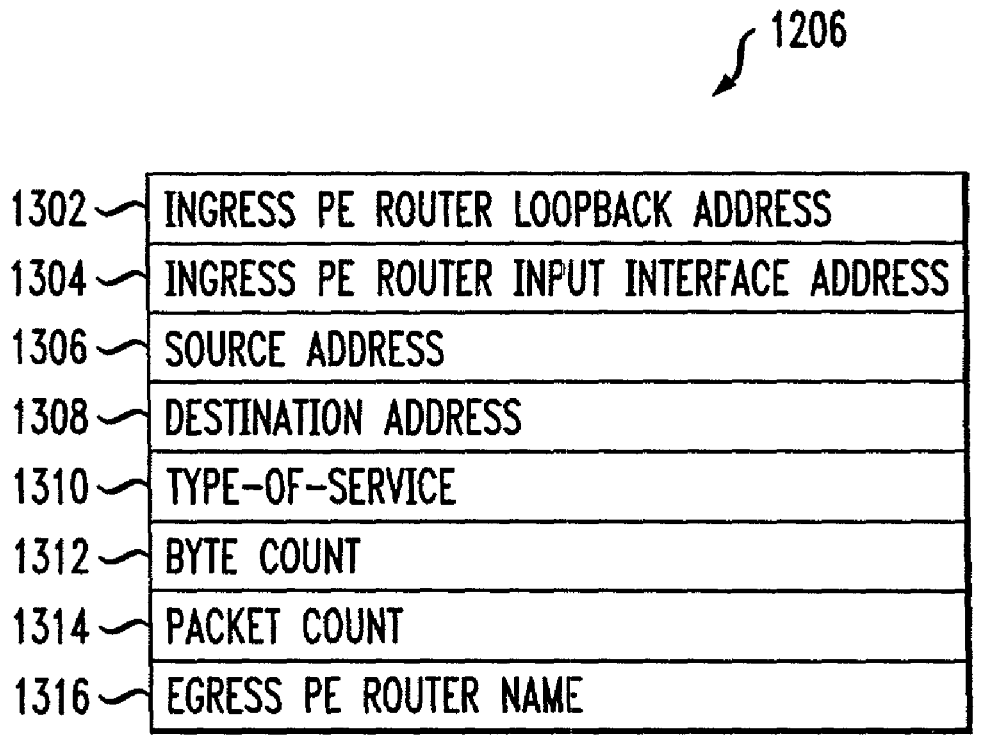
FIG. 13 shows the format of an ingress record.

FIG. 13 shows the format of an ingress record 1206. It contains the ingress PE router loopback address 1302, the ingress PE router input interface address 1304, source address 1306, destination address 1308, type-of-service 1310, byte count 1312, and packet count 1314. The source address 1306 uniquely identifies the source of a flow. The destination address 1304 uniquely identifies the destination of a flow. The type-of-service 1310 characterizes the real-time requirements of the flow. For example, a flow may carry streaming audio and video. This would be high priority traffic. A flow may carry a file transfer. This would be low priority traffic.

The format of the source address 1306, destination address 1308, and type-of-service 1310 depend on the specific technology that is used to implement the network. For example, Internet Protocol Version 4 (IPV4) uses 32 bits for addressing and provides four bits for a priority field. Internet Protocol Version 6 (IPV6) uses 128 bits for addressing and provides eight bits for a class field. More information regarding these protocols may be found on the IETF website, http://www.ietf.org, which is incorporated by reference.

The byte count 1312 and packet count 1314 indicate the number of bytes and packets that are reported by this flow record, respectively. A PE router may export multiple flow records for a flow. Each of these records reports the number of bytes and packets for its portion of the flow.

The egress PE router name 1316 is initialized to an empty string. This element designates the name of the egress PE router for this flow. Ingress records are processed as described in detail hereinafter. When the egress PE router is identified for a flow, the name of that PE router is included in the ingress record 1206.

Figure 14A:
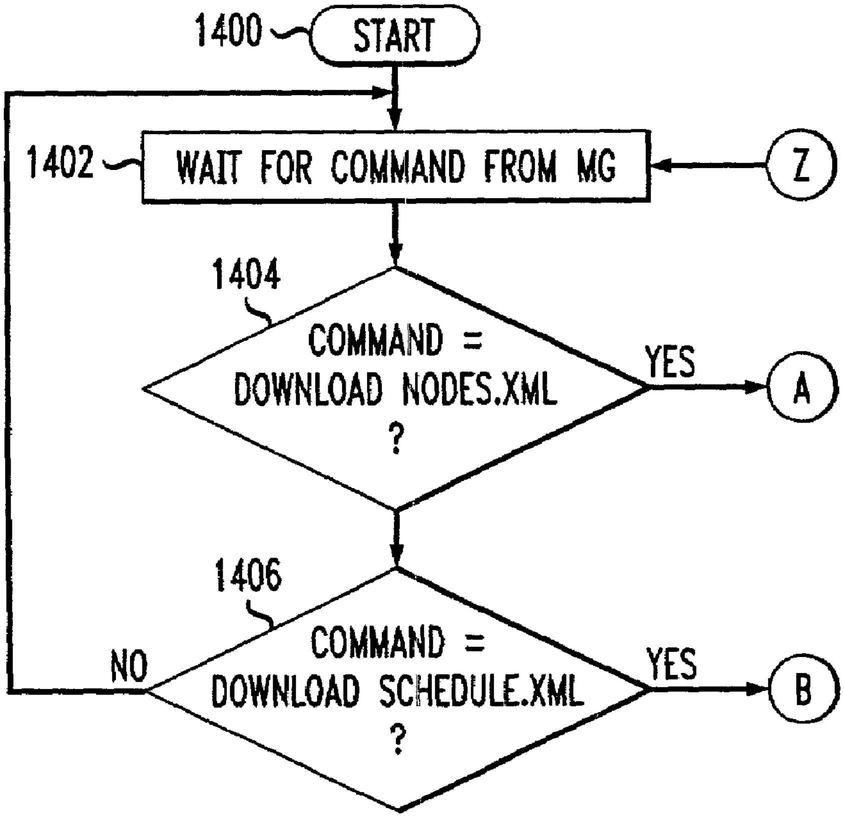
FIGS. 14A–14D are flowcharts for the Flow Record Processor.

FIG. 14A is a flowchart for the Controller 1200 on Flow Record Processor 908. Execution begins at step 1400. At step 1402, execution blocks until a command is received from Controller 1200 on Matrix Generator 922. Execution proceeds to step 1404 after a command is received. A check is done at step 1404 to determine if the command is to download the nodes.xml file. If yes, execution proceeds to point A. Otherwise, execution proceeds to step 1406. A check is done at step 1406 to determine if the command is to download the schedule.xml file. If yes, execution proceeds to point B. Otherwise, execution proceeds to step 1402.

Figure 14B:
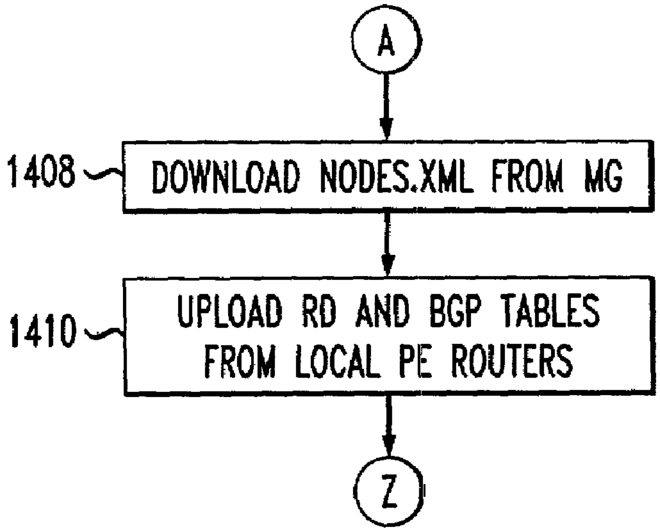

FIG. 14B shows a flowchart for downloading and processing the nodes.xml file. Execution begins at point A. At step 1408, the nodes.xml file is downloaded from the MG 922. At step 1410, the RD and BGP tables are uploaded from the local PE routers. These are the PE routers in the same service node as the FRP. The addresses of these routers are defined in the nodes.xml file. Execution continues to point Z on FIG. 14A.

Figure 14C:
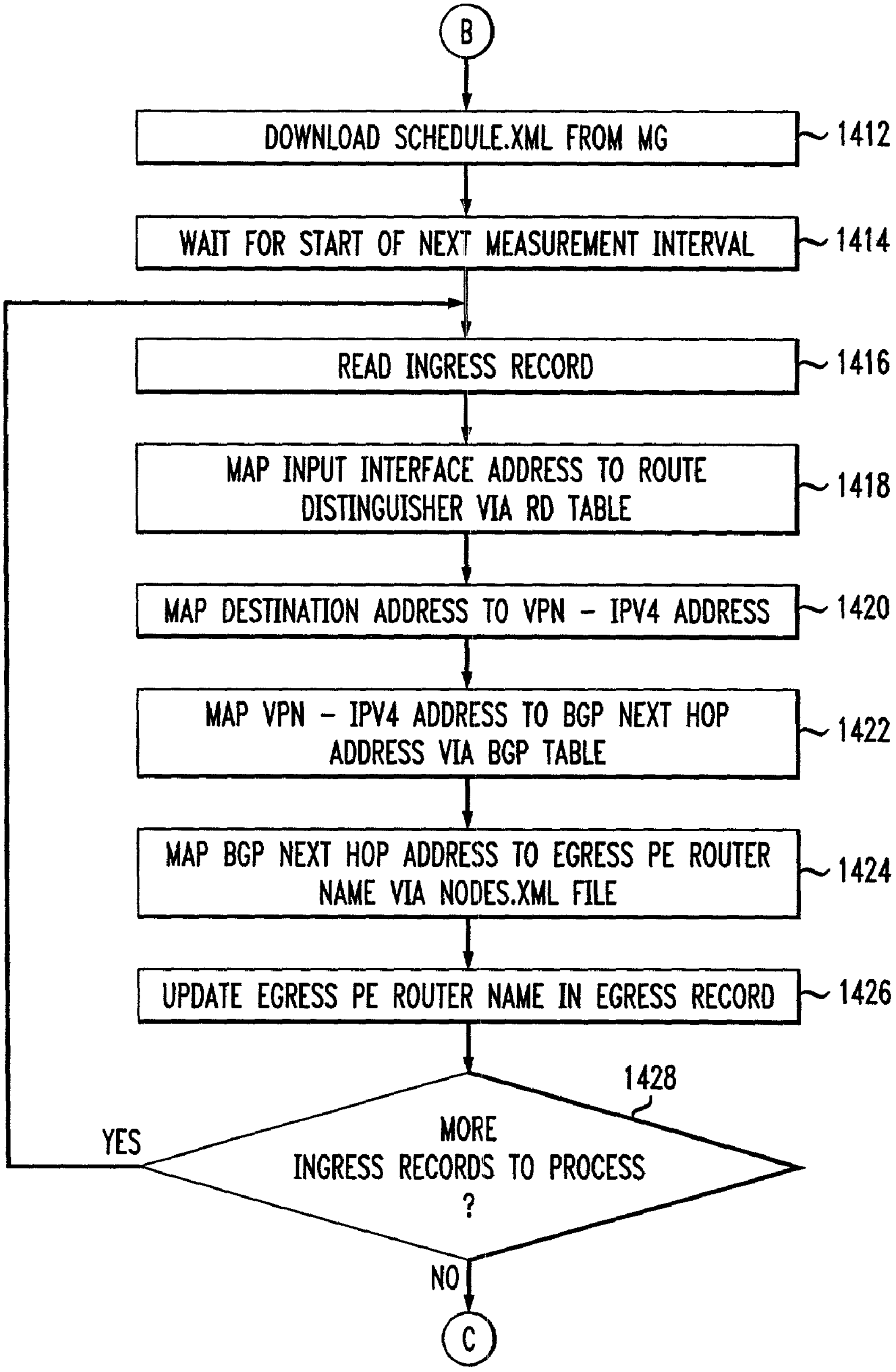

FIG. 14C shows a flowchart for downloading and processing the schedule.xml file. Execution begins at point B. At step 1412, the schedule.xml file is downloaded from MG 922. At step 1414, execution blocks until the start of the next measurement interval. At step 1416, an ingress record 1206 is read from the ingress file 1208. At step 1418, the input interface address is mapped to a route distinguisher by using the information in the Route Distinguisher Table 208. At step 1420, the destination address is mapped to a VPN IPV4 address by using the route distinguisher as a prefix. At step 1422, the VPN IPV4 address is mapped to a BGP next hop address by using the information in the BGP Table 218. At step 1424, the BGP next hop address is mapped to the name of the egress PE router via the nodes.xml file 1002. At step 1426, the ingress record 1206 is updated with the name of the egress PE router 136. At step 1428, a check is done to determine if there are more ingress records to process. If yes, execution proceeds to step 1416. Otherwise, execution continues to point C.

Figure 14D:
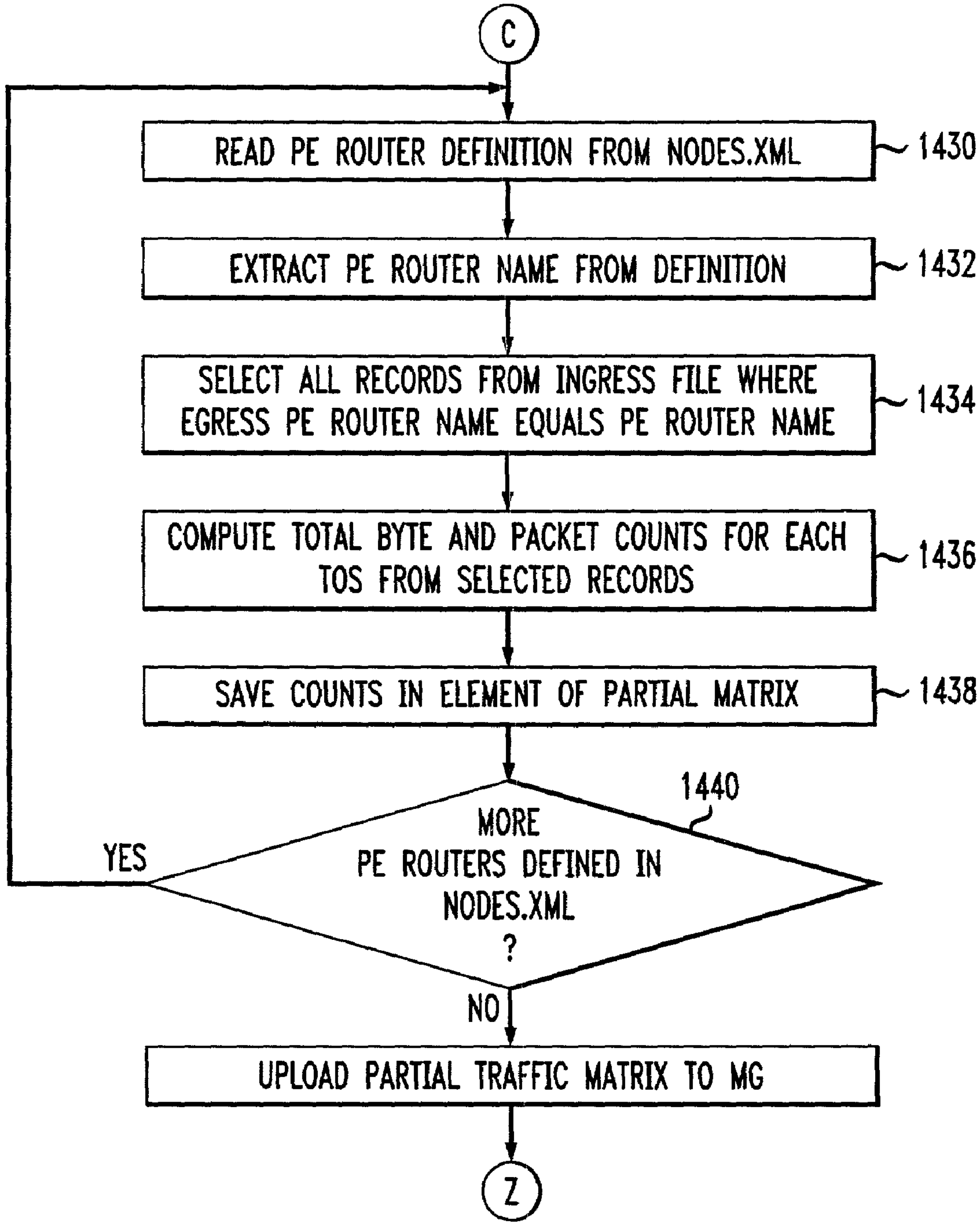

FIG. 14D shows the flowchart for computing a partial traffic matrix on each Flow Record Processor 908. Execution starts at point C. At step 1430, a PE router definition is read from the nodes.xml file 1002. At step 1432, the PE router name is extracted from this definition. At step 1434, all records with a matching egress PE router name are selected from the ingress file 1208. At step 1436, the total byte and packet Counts for each type-of-service (TOS) are computed. At step 1438, these counts are saved in an element of the partial matrix. At step 1440, a check is done to determine if more records need to be processed from the nodes.xml file 1212. If yes, execution proceeds to step 1430. Otherwise, the partial traffic matrix is uploaded to the MG at step 1442. Execution continues to point Z on FIG. 14A.

Figure 15:
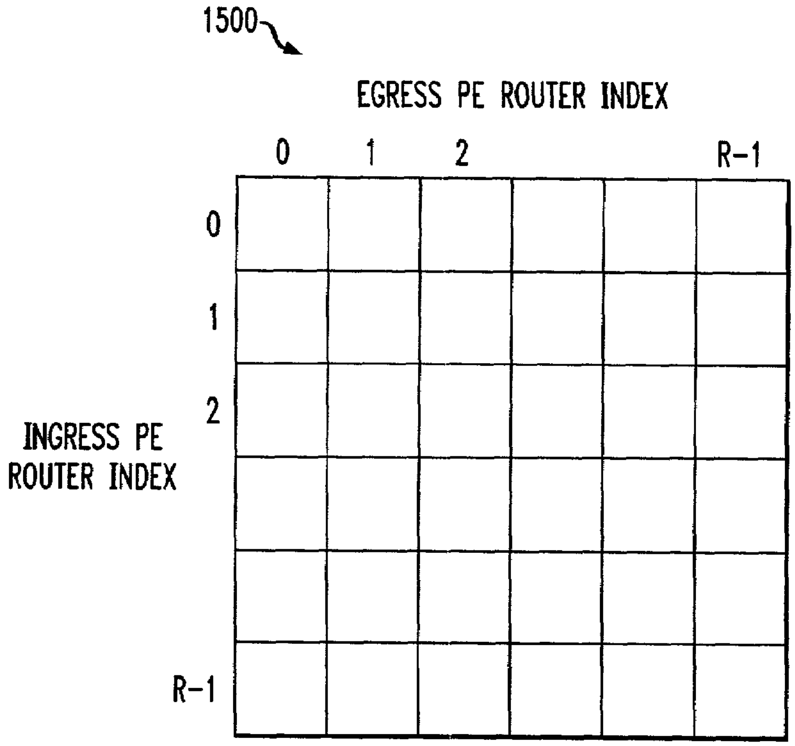
FIG. 15 shows the format of a total PE router to PE router traffic matrix.

FIG. 15 shows the format of a total traffic matrix 1500 that is generated by the MG 922. Each element in the matrix shows the number of bytes and/or packets with a specific type-of-service (TOS) that are transmitted from a source PE router to a destination PE router during a measurement interval. Separate matrixes are generated for each TOS.

A traffic matrix contains one row for each PE router. The index of a PE router is determined by its sequence in the nodes.xml file. The first PE router in that file has an index of zero. The last PE router in that file has an index of R−1 where R is the number of PE routers.

Each FRP generates partial traffic matrixes that represent the distribution of packet flows from its PE routers. In the illustrative backbone network 100, each FRP 908, 914, 928, and 936 generates one row of the traffic matrix. These four partial matrixes are uploaded to the MG 922 and are added together to form a total traffic matrix 1008.

Figure 16:
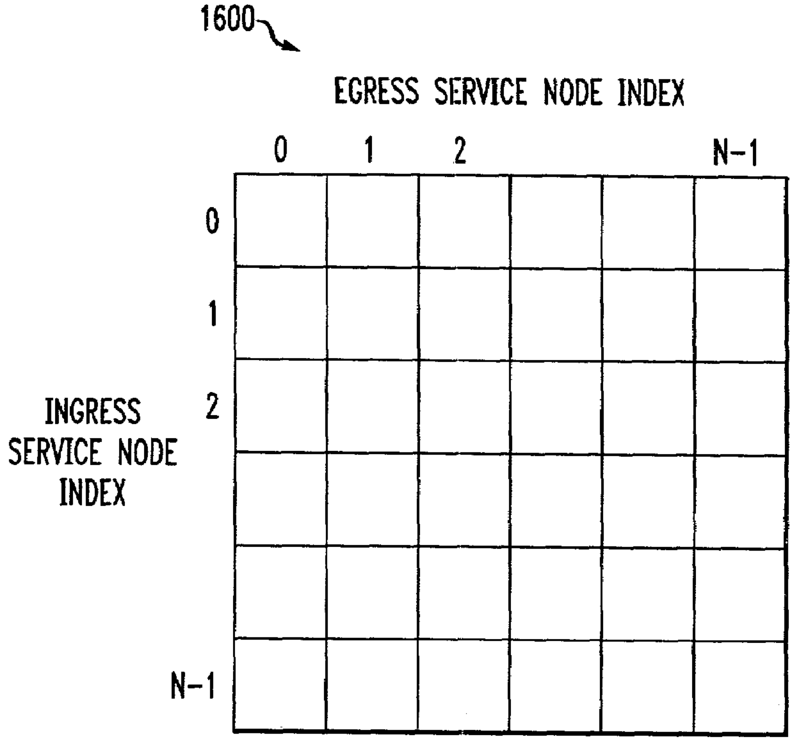
FIG. 16 shows the format of a total service node to service node traffic matrix.

FIG. 16 shows the format of a total traffic matrix 1600 that is generated by the MG 922. Each element in the matrix shows the number of bytes and/or packets with a specific type-of-service that are transmitted from a source service node to a destination service node during a measurement interval. Separate matrixes are generated for each type-of-service.

A traffic matrix contains one row for each service node. The index of a service node is determined by its sequence in the nodes.xml file. The first service node in that file has an index of zero. The last service node in that file has an index of N−1 where N is the number of service nodes.

Each FRP generates one row of the total traffic matrix. In the illustrative backbone network 100, each FRP 908, 914, 928, and 936 generates one row of the traffic matrix. These four partial matrixes are uploaded to the MG 922 and are added to form a total traffic matrix 1600.

A second embodiment of this invention uses sampled flow records to calculate a traffic matrix. To generate a flow record for every flow on an interface, a PE router must analyze every incoming packet on that interface. This can impose a significant processing overhead. To minimize this overhead, a sampling technique can be used. Every M-th packet is analyzed and flows are identified from sampled packets. The byte and packet counts reported by the PE router are adjusted accordingly (i.e. multiplied by M). Therefore, no change is required to the FRP or MG software.

The first and second embodiments of this invention use schedule.xml to define the start and duration of measurement intervals. A third embodiment of the present invention automatically selects measurement intervals for which a matrix should be generated. For example, the system can compute a matrix each day at the peak traffic interval for a specific PE router (or set of PE routers). Factors such as the traffic load on a communications link or the CPU load on a PE router can be considered when selecting a measurement interval. Historical data can be used to identify times of peak traffic. Faults reported by network elements may also be used to identify intervals when a traffic matrix should be generated. Other factors of interest to the users may also be used and are within the scope of this invention.

Thresholds can be configured to define relevant parameters. Some examples of thresholds are: total traffic on specific interfaces of specific PE routers, incoming traffic on specific interfaces of specific PE routers, outgoing traffic on specific interfaces of specific PE routers, total traffic at specific service nodes, incoming traffic at specific service nodes, and outgoing traffic at specific service nodes.

A sample schedule.xml for this embodiment is shown in the following listing. It indicates that ingress files must be generated on a continuous basis every 15 minutes.

```
<schedule>
  <measurement-interval/>
    Continuous, 15 minutes
</schedule>
```

Some of the preceding embodiments may be combined together. For example, the second and third embodiments may be used to provide a system that automatically generates matrixes for peak traffic intervals from sampled flow records.

Numerous other embodiments are also possible. For example, a system can automatically identify the most active PE routers or service nodes during a 24-hour period and generate a partial matrix th at characterizes the distribution of traffic entering and/or exiting those service nodes.

A system can use historical information to minimize the time required for uploading data and computing a matrix. Assume that a matrix is to be computed for the 15-minute interval starting at 17:00 GMT. If the system has previously computed several matrixes for this same interval on this same day of the week, it can identify those matrix elements that have the lowest byte and packet counts. In this manner, it can identify specific ingress and egress files that need not be uploaded. The matrix elements can be estimated based on an average of the stored values.

While the invention has been described with reference to specific embodiments, modifications and variations of the invention may be constructed without departing from the scope of the invention that is defined in the following claims.

What is claimed is:

1. A method for provisioning a service node of a packet network that connects virtual private network (VPN) sites, said packet network comprised of a plurality of service nodes, each service node comprising at least one Provider Edge (PE) router and at least one Flow Record Processor (FRP), the method comprising the steps of:

downloading a set of configuration files from a Matrix Generator (MG) server to the at least one FRP, said set of configuration files specifying measurement intervals for traffic matrixes which are to be generated, said traffic matrixes describing distributions of packet flows;

uploading Border Gateway Protocol (BGP) and Route Distinguisher (RD) Tables from the at least one PE router to the at least one FRP;

exporting flow records from the at least one PE router to the at least one FRP;

receiving and processing said flow records at the at least one FRP;

generating partial traffic matrixes at said at least one FRP;

uploading partial traffic matrixes from the at least one FRP to the MG;

computing a total traffic matrix for a measurement interval by summing the partial traffic matrixes for said measurement interval;

determining whether the service node has adequate capacity based on the traffic patterns established from the generated traffic matrixes; and if the capacity is not adequate, rerouting future flows to establish adequate capacity.

2. The method of claim 1 wherein the configuration files comprise a start time and duration for the measurement interval.

3. The method of claim 2 wherein the measurement interval comprises one or more intervals that occur at a designated day and time every week.

4. The method of claim 2 wherein the measurement interval includes a designated date and time.

5. The method of claim 2 wherein measurements for the measurement interval are generated on a continuous basis.

6. The method of claim 2 wherein the configuration files are expressed in Extensible Markup Language (XML).

7. The method of claim 1 wherein the configuration files include a name for the service node, a name and address for the at least one FRP, and a name and address for the at least one PE router.

8. The method of claim 7 wherein the configuration files are expressed in Extensible Markup Language (XML).

9. The method of claim 1 wherein the at least one FRP comprises software to receive flow records exported by the at least one PE router.

10. The method of claim 9 wherein the at least one PE router exports flow records to the at least one FRP for incoming flows from customer edge (CE) routers.

11. The method of claim 9 wherein the at least one FRP determines if a flow record is received within the measurement interval by comparing a start time and end time of the measurement interval with a time corresponding to the receipt of the flow record.

12. The method of claim 9 wherein the step of receiving and processing said flow records at the at least one FRP further comprises the step of creating an ingress record for an incoming flow.

13. The method of claim 12 wherein each ingress record comprises an ingress PE router loopback address.

14. The method of claim 12 wherein each ingress record comprises an ingress PE router input interface address.

15. The method of claim 12 wherein each ingress record comprises a source address.

16. The method of claim 12 wherein each ingress record comprises a destination address.

17. The method of claim 12 wherein each ingress record comprises a type-of-service indicator.

18. The method of claim 12 wherein each ingress record comprises a byte count.

19. The method of claim 12 wherein each ingress record comprises a packet count.

20. The method of claim 12 wherein each ingress record comprises an egress PE router name.

21. The method of claim 20 wherein the egress PE router name in the ingress record is initialized to empty.

22. The method of claim 21 wherein the step of generating partial traffic matrixes further comprises the step of storing ingress records generated during the measurement interval in ingress files.

23. The method of claim 22 wherein the at least one FRP creates separate ingress files for the at least one PE router associated with the at least one FRP.

24. The method of claim 23 wherein the step of generating partial traffic matrixes further comprises the step of processing each ingress record.

25. The method of claim 24 wherein the step of generating partial traffic matrixes further comprises the step of mapping the input interface address to a route distinguisher via the RD table for the at least one PE router.

26. The method of claim 25 wherein the step of generating partial traffic matrixes further comprises the step of prefixing the destination address with the route distinguisher to create a VPN-IPV4 address.

27. The method of claim 26 wherein the step of generating partial traffic matrixes further comprises the step of mapping the VPN-IPV4 address to a BGP next hop address via the BGP table for the at least one PE router.

28. The method of claim 27 wherein the step of generating partial traffic matrixes further comprises the step of mapping the BGP next hop address to an egress PE router name via the configuration file.

29. The method of claim 28 wherein the egress PE router name in the ingress record is updated.

30. The method of claim 29 wherein the step of generating partial traffic matrixes further comprises the step of reading a PE router definition from the configuration file.

31. The method of claim 30 wherein the step of generating partial traffic matrixes further comprises the step of selecting all records with a matching PE router name.

32. The method of claim 31 wherein the step of generating partial traffic matrixes further comprises the step of computing the total byte and packet counts for each type-of-service from the selected records.

33. The method of claim 32 wherein the step of generating partial traffic matrixes further comprises the step of saving the total byte and packet counts in an element of the partial traffic matrix.

* * * * *